(12) United States Patent
Muhonen

(10) Patent No.: US 6,920,317 B1
(45) Date of Patent: Jul. 19, 2005

(54) CHARGING OF SUBSCRIBERS WITH LOCALIZED SERVICE AREAS IN A MOBILE TELECOMMUNICATIONS NETWORK

(75) Inventor: Ahti Muhonen, Hirvihaara (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/787,125

(22) PCT Filed: Sep. 14, 1999

(86) PCT No.: PCT/FI99/00750
§ 371 (c)(1),
(2), (4) Date: Mar. 14, 2001

(87) PCT Pub. No.: WO00/16579
PCT Pub. Date: Mar. 23, 2000

(30) Foreign Application Priority Data

Sep. 14, 1998 (FI) .................................. 981976

(51) Int. Cl.⁷ .......................................... H04M 11/00
(52) U.S. Cl. ...................... 455/405; 455/406; 455/407; 455/408; 455/432.1; 370/352
(58) Field of Search ................. 455/405, 406, 455/407, 408, 432.1, 435.2, 552.1; 370/328, 352, 353, 354, 355, 356

(56) References Cited

U.S. PATENT DOCUMENTS

| | | | | | |
|---|---|---|---|---|---|
| 5,754,955 | A | * | 5/1998 | Ekbatani | 455/422.1 |
| 5,974,320 | A | * | 10/1999 | Ward et al. | 455/437 |
| 6,122,510 | A | * | 9/2000 | Granberg | 455/433 |
| 6,320,873 | B1 | * | 11/2001 | Nevo et al. | 370/466 |
| 6,347,224 | B1 | * | 2/2002 | Smyth et al. | 455/406 |

FOREIGN PATENT DOCUMENTS

| | | | | |
|---|---|---|---|---|
| DE | 734144 | * | 9/1996 | .......... H04M/15/28 |
| EP | 0568824 A3 | | 11/1993 | |
| EP | 0597638 A1 | | 5/1994 | |
| FI | 963142 | | 8/1998 | |
| FI | 981976 | | 2/2000 | |
| GB | 0597638 | * | 11/1993 | ............ H04Q/7/04 |
| WO | WO 96/20570 | | 7/1996 | |
| WO | WO 96/20571 | | 7/1996 | |
| WO | WO 97/48245 | | 12/1997 | |
| WO | WO 98/30056 | | 7/1998 | |
| WO | WO 98/58505 | | 12/1998 | |

* cited by examiner

Primary Examiner—Stephen D'Agosta
(74) Attorney, Agent, or Firm—Pillsbury Winthrop Shaw Pittman LLP

(57) ABSTRACT

A mobility support element (MSC/VLR; SGSN, GGSN) for a cellular radio network supporting circuit-switched and packet-switched connections to/from a mobile station (MS). For each mobile station (MS), there is a set (LSA1, LSA2) of special cells (C1–C3, C9, C10) providing special service. A radio control element (BSC1, BSC2) determines whether the mobile station (MS) is in a special cell. Charging elements (CG, BC) receive charging information comprising detail items which indicate events which affect charging. The mobility support element (MSC/VLR; SGSN, GGSN) receives, when it begins to serve the mobile station, a list (LSA1, LSA2) of the special cells for the mobile station, and sends the list to the serving radio control element (BSC1, BSC2). The mobility support element also supports or performs classification of the detail items into two classes depending on whether or not the corresponding event occurred while the mobile station was in a special cell.

9 Claims, 2 Drawing Sheets

CHARGING OF SUBSCRIBERS WITH LOCALIZED SERVICE AREAS IN A MOBILE TELECOMMUNICATIONS NETWORK

This application is the national phase of international application PCT/FI99/00750 filed Sep. 14, 1999 which designated the U.S. and that international application was published under PCT Article 21(2) in English.

BACKGROUND OF THE INVENTION

The invention relates to equipment and a procedure for supporting charging of subscribers with localised service areas in a mobile telecommunications network which comprises a packet radio network. An example of such networks is a combined GSM/GPRS network.

FIG. 1 is a block diagram illustrating a cellular telecommunications network supporting circuit-switched (CS) connections (e.g. Global System for Mobile Communication, GSM) and packet-switched (PS) connections (e.g. General Packet Radio Service GPRS). Circuit-switched connections are shown as solid lines and packet-switched connections are shown as dotted lines. The basic structure of the GSM system comprises two elements: a base station system BSS and a network subsystem NSS. The BSS and mobile stations MS communicate over radio links. In the base station system BSS each cell is served by a base station BTS. A number of base stations are connected to a base station controller BSC, which controls the radio frequencies and channels used by the BTS. Base station controllers BSC are connected to a mobile services switching centre MSC. As regards a more detailed description of the GSM system, reference is made to the ETSI/GSM recommendations and *The GSM System for Mobile Communications*, M. Mouly and M. Pautet, Palaiseau, France, 1992, ISBN:2-957190-07-7.

The GPRS infrastructure comprises support nodes such as a GPRS gateway support node (GGSN) and a GPRS serving support node (SGSN). The main functions of the GGSN nodes involve interaction with the external data network. The GGSN updates the location directory using routing information supplied by the SGSNs about an MS's path and routes the external data network protocol packet encapsulated over the GPRS backbone to the SGSN currently serving the MS. It also decapsulates and forwards external data network packets to the appropriate data network and handles the billing of data traffic.

The main functions of the SGSN are to detect new GPRS mobile stations in its service area, handle the process of registering the new MSs along with the GPRS registers, send/receive data packets to/from the GPRS MS, and keep a record of the location of the MSs inside its service area. The subscription information is stored in a GPRS register (HLR) where the mapping between a mobile's identity (such as MS-ISDN or IMSI) and the PSPDN address is stored. The GPRS register acts as a database from which the SGSNs can ask whether a new MS in its area is allowed to join the GPRS network.

The GPRS gateway support nodes GGSN connect an operator's GPRS network to external systems, such as other operators' GPRS systems, data networks 11, such as an IP network (Internet) or a X.25 network, and service centres. A border gateway BG provides access to an inter-operator GPRS backbone network 12. The GGSN may also be connected directly to a private corporate network or a host. The GGSN includes GPRS subscribers' PDP addresses and routing information, i.e. SGSN addresses. Routing information is used for tunnelling protocol data units PDU from data network 11 to the current switching point of the MS, i.e. to the serving SGSN. The functionalities of the SGSN and GGSN can be connected to the same physical node.

The home location register HLR of the GSM network contains GPRS subscriber data and routing information and it maps the subscriber's IMSI into one or more pairs of the PDP type and PDP address. The HLR also maps each PDP type and PDP address pair into a GGSN node. The SGSN has a Gr interface to the HLR (a direct signalling connection or via an internal backbone network 13). The HLR of a roaming MS and its serving SGSN may be in different mobile communication networks.

The intra-operator backbone network 13, which interconnects an operator's SGSN and GGSN equipment can be implemented, for example, by means of a local network, such as an IP network. It should be noted that an operator's GPRS network can also be implemented without the intra-operator backbone network, e.g. by providing all features in one computer.

In cellular mobile communications systems, a mobile station may roam freely within the area of the mobile communications network and connect to the base transceiver station signal received best at a given time. Usually, all base transceiver stations provide substantially similar services for the mobile stations in a network. Some base transceiver stations can, however, be defined to provide a certain special service for all mobile stations of the network, e.g. call charges below the normal tariff. The base transceiver station broadcasts a message concerning such a special service on its packet broadcast control channel (PBCCH), whereby mobile subscribers in the area note that they are within a special service area of the network and may take advantage of this service.

Within the context of this application, such special service areas are referred to as localized service areas (LSA) and the support of LSA is called SoLSA. A subscriber having SoLSA service is called a SoLSA subscriber. A mobile station currently having support for SoLSA is said to be in LSA mode. This may mean e.g. that the mobile station indicates to its user that certain special features (like lower rates or extra services) are available, and it uses these features when applicable. The concept of localised service areas (LSA) is the subject matter of references 1 to 3.

FIG. 1 also shows two LSA areas, LSA1 and LSA2. LSA1 consists of cells C1 to C3, and LSA2 consists of cells C9 and C10. It is assumed that the mobile station MS moves, during a call, along path 10 from cell C1 to cell C10. The call is established in an LSA cell (C1). Between cells C1 and C2, the MS moves slightly out of LSA1, in the sense that better coverage would be obtained from cell C7 which is not an LSA cell. However, the handover algorithm favours LSA cells and, consequently, the MS is not handed over to the base station of C7. When the MS crosses cell C4, the call cannot be maintained as an LSA call. When the MS approaches cell C9, it is handed over to the base station of C9 and the call is again treated as an LSA call.

The present invention involves mainly charging-related aspects of SoLSA subscribers. Charging in a GPRS system is defined in reference 4. For charging, a telecommunications network generally comprises a billing system, such as the Billing Centre BC which may be connected to an MSC, as shown in FIG. 1. The network may also comprise dedicated Charging Gateways CG, as shown between the intra-operator backbone network 13 and the billing centre BC. (Alternatively, the dedicated charging gateways can be replaced by distributed functionality resident in the SGSN and GGSN nodes.)

According to reference 4, collecting charging information in a GPRS system can be briefly summarised as follows. Network elements, such as GPRS support nodes (SGSN and GGSN), monitor charging-related events (transmitting data packets, attaching to the network, mobility management, etc.) The network elements send charging data records, or CDRs, to the Billing Centre BC (possibly via Charging gateways CG). CDRs created by SGSN or GGSN nodes are called S-CDRs or G-CDR, respectively. In addition, an M-CDR conveys information on mobility management-related charging events. There are also SMO-CDRs and SMT-CDRs for MS-originated and MS-terminated short messages. For each charging-related event, there is a corresponding item or entry in the CDR. In the terminology of reference 4, the charging-related items are collectively referred to as a "List of Traffic Volumes". Reference 4 defines a set of rules for opening and closing each type of CDR, and the contents thereof.

A problem with prior art charging systems is that they completely ignore the SoLSA aspects.

BRIEF DESCRIPTION OF THE INVENTION

An object of the invention is to provide mechanisms for supporting charging of users with localised service areas in a mobile telecommunications network which comprises a packet radio network. The object is achieved with equipment and a procedure which are characterized by what is disclosed in the attached independent claims. Preferred embodiments of the invention are disclosed in the attached dependent claims.

The invention is based on the idea that the packet radio network is adapted to classify the charging-related detail items of the CDR into multiple classes depending on whether or not the corresponding event occurred while the mobile station was in an LSA cell. This means that the mobility support element may actually classify the detail items into two classes, depending on whether or not the corresponding event occurred while the mobile station was in an LSA cell. Classifying the detail items into two classes is sufficient, if the LSA cells are similar as far as charging is concerned. If there are more than two types of charging, for instance more than two different tariffs, then the detail items should classified into a corresponding number of classes.

According to a preferred embodiment of the invention, a mobility support element, such as an SGSN node or a GGSN node, performs or at least supports this classification. Instead of performing the actual classification, the mobility support element may support later classification by sending charging detail records which at least indirectly indicate whether or not the mobile station was in an LSA cell (and what kind of LSA cell, if they are different charging-wise) when the corresponding event took place. Such indirect indication means that on the basis of the mobile station's LSA cell list, it is possible to classify the detail items in the CDR into two classes, depending on whether or not the MS was in a special cell.

According to a preferred embodiment of the invention, centralised charging is supplemented with distributed pre-processing in the support nodes of the packet radio network, preferably in the SGSN nodes. The reason for using the SGSN nodes for charging is as follows. The network element making decisions about handovers must be informed about the mobile station's LSA cells. In a GSM system, such a network element is the Base Station Controller BSC. In 3rd generation (3G) systems, it will probably be called Radio Network Controller RNC. (Later in this application, the term 'BSC' refers commonly to both a BSC and an RNC.) The network element which informs the BSC about the LSA cells is most conveniently the SGSN serving the mobile station MS. Thus the SGSN must be aware of the MS's LSA cells. Preferably, the MS-specific LSA information is included in a modified INSERT SUBSCRIBER DATA (IMSI, GPRS SUBSCRIPTION DATA, SOLSA PARAMETERS) message which the Home Location Register HLR sends to the serving SGSN when the MS initiates a GPRS ATTACH or a ROUTING AREA UPDATE procedure. The serving SGSN can deliver the subscriber-specific SoLSA parameters to the serving BSC e.g. in a modified BSSGP_DL_UNITDATA.REQ message or in a new dedicated BSSGP_SoLSA message. The BSC can take the SoLSA parameters into account in the network-controlled cell reselection, when a BSC-based solution will be used.

Because the SGSN must be aware of the MS's LSA cells, some synergy benefits will be achieved by using the SGSN as a pre-processor for charging.

BRIEF DESCRIPTION OF THE DRAWINGS

The invention will be described in more detail by means of preferred embodiments with reference to the appended drawing in which.

DETAILED DESCRIPTION OF THE INVENTION

Figure 2:
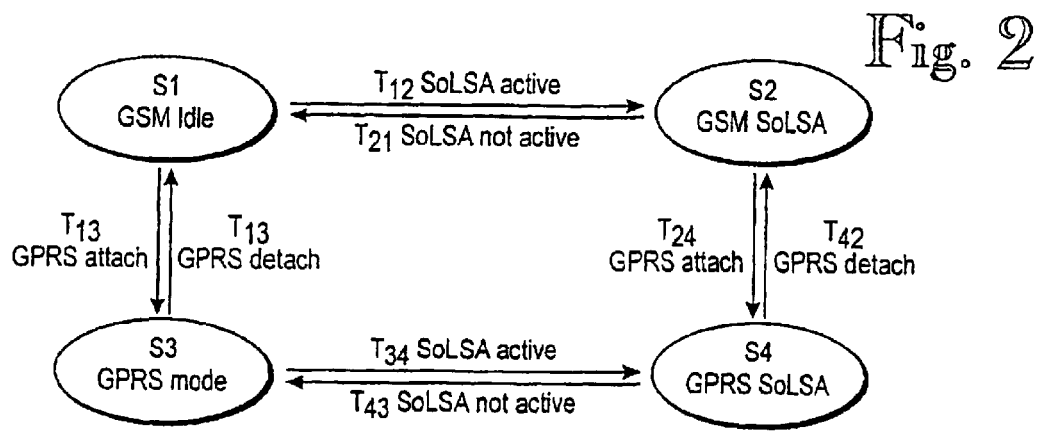
FIG. 2 is a signalling diagram illustrating a preferred embodiment of the invention.

A limitation associated with prior art systems for providing special services in a network is that SoLSA is only defined for circuit-switched connections, i.e. GSM and its derivatives. In a dual-mode GSM/GPRS network, the coverage of GSM and GPRS services may be different. Thus the prior art SoLSA provides little or no support for packet-switched connections, e.g. GPRS. A specific problem with the prior art GSM SoLSA is encountered when a dual-mode mobile station with SoLSA active is involved in a GPRS connection. In such a situation, SoLSA support is discontinued because GPRS cell reselection does not take SoLSA into account. A solution for this problem is disclosed in Co-assigned Finnish patent application FI981130, "Solunvalinta pakettiverkossa", filed 20 May 1998. For convenience, the relevant subject-matter of the '1130 application is repeated here. As shown in FIG. 2, a functioning GSM/GPRS inter-working system can be attained by a method for controlling the operation of a mobile station, the operation comprising camping. The method is summarized as follows. The camping is modellable as a number of states (S1 to S4) with predetermined state transitions ($S_{12}$–$S_{34}$) between them, wherein each one of the states corresponds to a set of locally varying features which the mobile station currently supports. The features comprise a first feature indicating whether the mobile station is in circuit-switched mode or packet-switched mode, and a second feature indicating whether or not the mobile station is in localised service area (LSA) mode. For all combinations of the first and second features, there is a corresponding state (S1 to S4), and for each one of these states, there are two originating state transitions and two terminating state transitions, each one of the originating state transitions corresponding to a change in the respective feature.

Preferably, the criteria for the state transitions are based on the fact that of the two communications modes, i.e. circuit-switched and packet-switched, one has better coverage. In a combined GSM/GPRS system, GSM typically has better coverage than GPRS. Thus, in situations where there is a possible conflict between a state transition based on GSM criteria and a state transition based on GPRS criteria, it is advantageous to use the GPRS criteria to determine whether the mobile station is in SoLSA mode or not. Such a conflict may occur when the mobile station has an activated GPRS context (in Standby or Active state). In such a situation, the mobile station would not perform state transition $T_{12}$ unless $T_{34}$ is also possible.

Figure 3:
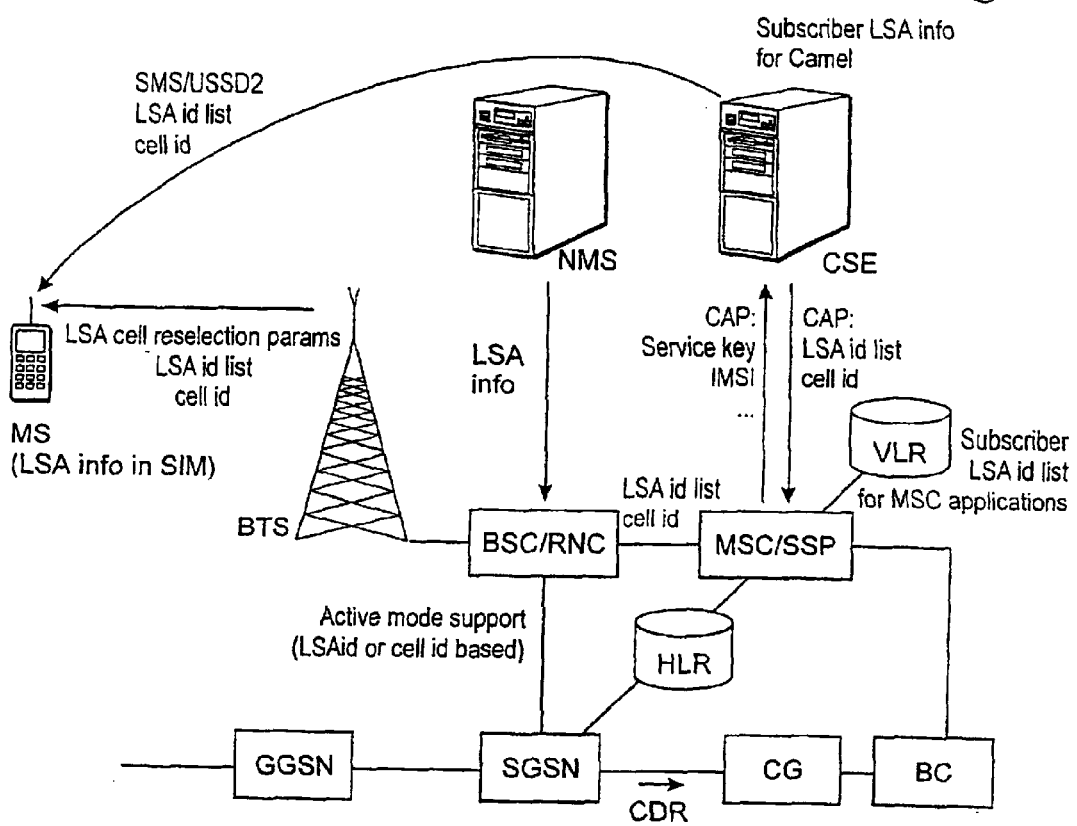
FIG. 3 shows a possible interconnection of the network elements responsible for LSA management and charging.

The block diagram of FIG. 3 shows a possible interconnection of the network elements responsible for LSA management and charging. Subscriber-specific LSA information can be stored and managed either in the Camel Service Environment CSE or in the Home Location Register HLR. Two types of LSAs can be foreseen, either a truly customised LSA for a small office area and a residential area ("office/home zone"), or a predefined LSA covering large campuses, sections of cities and districts ("city zones"), etc. These two LSAs fulfil different needs. They complement each other and they can be used simultaneously. A SoLSA subscriber can have a home LSA consisting of 1 or 2 cells, an office LSA consisting of 1 to 5 cells and a city LSA with dozens or hundreds of cells. The first two LSAs are preferably tailored on a per-subscriber basis. A truly subscriber-specific LSA can be defined on a cell identity basis and it can be very small, even consisting of only one cell, if necessary. The third LSA could rely on a certain predefined LSA definitions. LSA information can consist of:

List of cell identities belonging to an LSA (e.g.: Cell Global Identity (MCC+MNC+LAC+CI), MNC+LAC+CI LAC+CI or CI).
LSA_ID (The LSA ID is a number uniquely assigned to an area in one network. LSA ID can be associated with a Cell Identity list.)
LSA name (a text string describing an area and/or service, e.g. "Etsi Building").
LSA indication (a flag to activate/deactivate LSA indication)
LSA priority (a number value needed to support overlapping LSAs, for example a city zone and office cells in the same area).
LSA only access (Service outside LSAs is restricted).
LSA only access indication text (Text to be displayed when out of LSA area).
Exclusive access (User has exclusive access to a LSA).
Relevant MSP profile (an LSA may be associated with some MSP profiles).
Idle/active mode support (preferred cell selection in idle/active mode may be utilised in an LSA).

The network operator can use the Network Management Services NMS to define the subscriber's LSA areas. There can be one common list of LSA areas for a given subscriber. In this case, there are virtually no GSM/GPRS interworking problems. The subscriber's LSA data should be transferred to the BSC via circuit-switched (CS) and packet-switched (PS) connections, as needed (e.g. during call set-up for CS, and during GPRS Attach and inter-SGSN handover for PS). The LSA list should be broadcast on the BCCH and PBCCH (if allocated).

Alternatively, the LSA areas may be different for CS and PS services. In this case, the HLR has to store two separate LSA lists. However, it is sufficient to store only a single LSA list in the MS's SIM card. If no PBCCH is allocated, both CS and PS LSA lists should be broadcast on the BCCH. If both BCCH and PBCCH are allocated, there are at least two configuration options:

1) CS LSA ids are broadcast on the BCCH only, and PS LSA ids are broadcast on the PBCCH only. In this case, the priorities are applicable only inside CS and PS LSA areas.

2) Both CS and PS LSA ids are broadcast on the BCCH and PBCCH. Such a configuration is simpler than the previous one because the LSA priorities are followed in all situations.

For circuit-switched SoLSA, the BSC needs the subscriber's LSA data for active mode support in the BSC. A corresponding mechanism for packet-switched SoLSA should be implemented because the LSA data is needed for network-controlled cell reselection. The network-controlled cell reselection parameters are broadcast on the Packet Broadcast Control Channel PBCCH, and they are valid for all mobile stations in Ready state in the cell in question. Cell reselection commands can also be sent to an individual MS on a Packet Access Control Channel PACCH, in which case such a command overrides the PBCCH parameters. The SGSN nodes can get these parameters from the HLR e.g. in a modified INSERT SUBSCRIBER DATA message, whose parameters include the subscriber's IMSI, GPRS Subscription data and the SoLSA parameters). The HLR can send this message to the SGSN e.g. in response to a GPRS Attach procedure. The SGSN can deliver the subscriber-specific SoLSA parameters to the BSC serving the MS e.g. in a modified BSSGP_DL_UNITDATA.REQ message or in a new dedicated BSSGP_SoLSA message. The BSC can take the SoLSA parameters into account for the network-controlled cell reselection, if a BSC-based solution is used.

To summarise, the BTS sends to the MS:
on the BCCH: CS LSA_id list, CS LSA cell reselection parameters, and the cell_id;
on the PBCCH (if allocated): PS LSA_id list, PS LSA cell reselection parameters, the cell_id and network-controlled cell reselection parameters;
on the PACCH: individual cell reselection commands.

In each of these cases, it can be seen that the LSA parameters are needed for supporting the mobility of the mobile station, and for charging its subscriber. Therefore, certain synergy benefits will be achieved by using mobility support elements of the networks also as a pre-processor for charging purposes, as will be described below in more detail.

According to a primary embodiment of the invention, the Base Station Controller BSC currently serving the mobile station MS adds the MS's current cell identity (cell_id) into the data packets it sends to the serving SGSN. Thus the SGSN knows the cell identity of the mobile-originated (MO) packets. When the MS is in Ready mode, the SGSN also knows the cell_id of the MS before it sends mobile-terminated (MT) packets to the MS. Otherwise, the SGSN pages the MS, after which it knows the MS's current cell_id. In conclusion, the SGSN always knows the cell_id of the MS for both MO and MT packets.

Figure 1:
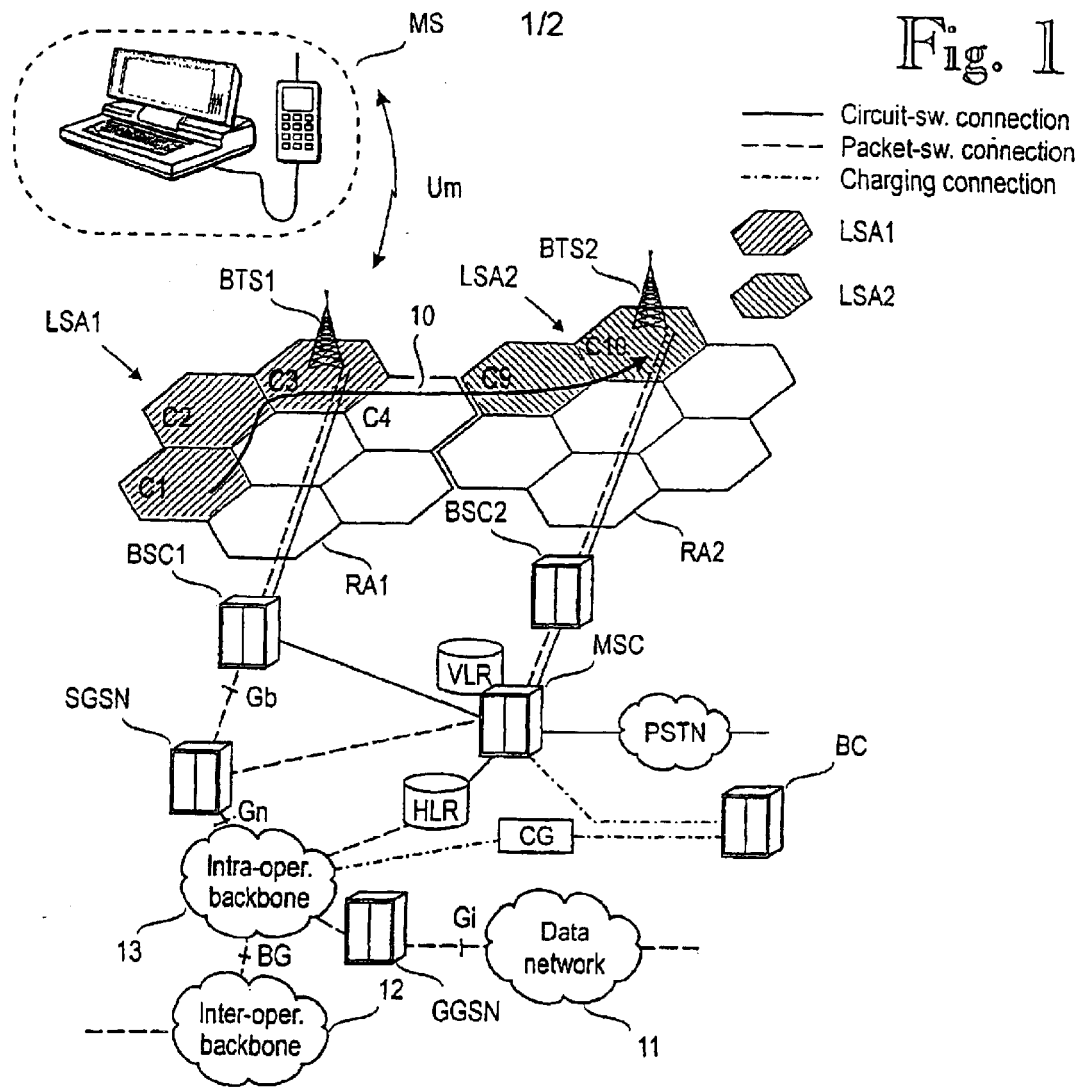
FIG. 1 is a block diagram showing some elements of a packet radio network which are essential for describing the invention.
Figure 4A:
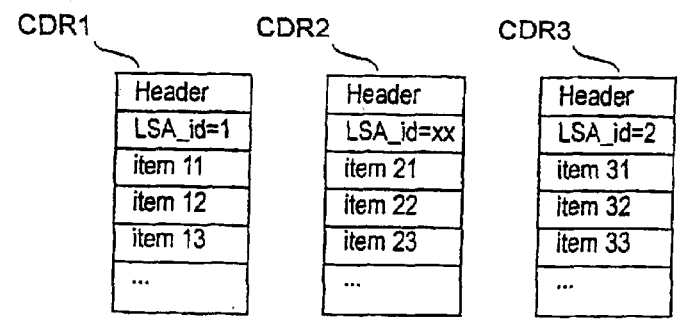
FIGS. 4A and 4B schematically illustrate charging detail records.

There are at least two ways in which the network can correlate the charging-related aspects of data transmission with the cell_id of the cell where the MS has sent or received data. For example, FIG. 4A depicts schematically a set of CDRs, CDR1 to CDR3, such that each CDR includes information from only one tariff zone (in this case, only one LSA). Each CDR includes a header. (For the purposes of this application, the word 'header' has a wide interpretation, in the sense that it comprises everything which is required by the relevant standards but which is not listed as detail items elsewhere in the CDR.) As long as the MS remains in the same LSA, the SGSN keeps open the S-CDR. When the MS moves to a different tariff zone, the previous S-CDR will be closed and a new one will be created. The set of CDRs comprising CDR1 to CDR3 correspond to the scenario of FIG. 1, wherein the MS moves along the path 10 from cell C1 to cell C10. As long as the MS is in LSA1 (i.e. cells C1 to C3), the SGSN keeps CDR1 open and collects charging-related detail items (item 11 to item 13, etc.) CDR1 also shows that all the items in it relate to events in an LSA whose LSA_id is 1 (i.e. LSA1). Similarly, CDR2 includes items relating to events which took place while the MS was in cell C4, which is not in an LSA (at least, to this subscriber) and which does not have an LSA_id. CDR3 includes items relating to events which took place while the MS was in cells C9 and C10, which to this subscriber constitute LSA2 having an LSA_id of 2.

In CDRs according to reference 4, the LSA_id can be transferred e.g. in a field called "Record extensions", but, preferably, a dedicated field should be defined for this purpose.

Figure 4B:
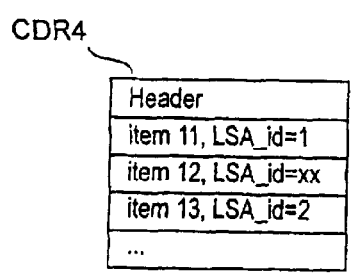

FIG. 4B shows a different CDR4, wherein each detail item has the corresponding LSA_id next to it. In this case, the format of the CDR according to reference 4 is definitely not sufficient, because the "Record extensions" field is common to the entire CDR.

FIGS. 4A and 4B show embodiments wherein the full LSA_id is included in the CDR. For charging purposes, it is sufficient to include only yes/no information, indicating whether or not the MS was in an LSA cell when the relevant event took place.

According to a secondary embodiment of the invention, the SGSN may not know the MS's SoLSA parameters, or the manufacturer or the operator prefers not to add to the complexity of the SGSN in the manner described in connection with the primary embodiment. In such a case, the format of the S-CDR can be changed so that its detail items (the List of Traffic Data Volumes field) record the cell_id and data volume for every different cell_id. Sorting the cells into LSA cells and non-LSA cells according to the MS's SoLSA parameters can take place in the Charging Gateway or the Billing Centre.

It is also possible to support SoLSA charging without changing the format of the S-CDR. In this case, the MS's most current cell_id is determined at the time when the S-CDR is created, and this cell_id will be used as a basis for charging. The cell where a GPRS ATTACH or a ROUTING AREA UPDATE procedure is performed determines the tariff zone. The changes in the MS's Routing Area are recorded in the M-CDR, and they could also be used for determining the tariff zone. If the LSA borders were also Routing Area borders, no other correlation mechanism would be needed. However, SoLSA charging based on existing CDRs is considered inflexible.

The description only illustrates preferred embodiments of the invention. The invention is not, however, limited to these examples or the terms used, but it may vary within the scope of the appended claims.

What is claimed is:

1. A method for supporting charging of a subscriber of a mobile station in a cellular radio network supporting circuit-switched and packet-switched connections with the mobile station, the method comprising:

defining, for each of a plurality of mobile stations, a corresponding set of special cells providing at least one special service to the corresponding mobile station;

reporting an indication of a set of special cells to at least one mobility support element in an INSERT SUBSCRIBER DATA message in response to a mobile station initiating an attach or a routing area update procedure;

responding to the reporting by sending the indication of the set of special cells to a radio control element in a downlink message; and determining whether the mobile station is in one of its corresponding special cells, wherein the charging information includes at least one detail item, each detail item indicating an event which affects charging, the method further comprising:

classifying the at least one detail item into at least one class of multiple classes depending, at least, on whether the corresponding event occurred while the mobile station was in one of its corresponding special cells wherein, the mobility support element is configured to perform or at least support the classification.

2. A method for supporting charging of a subscriber of a mobile station in a cellular radio network supporting circuit-switched and packet-switched connections with the mobile station, the method comprising:

defining, for each of a plurality of mobile stations, a corresponding set of special cells providing at least one special service to the corresponding mobile station;

determining whether at least one mobile station is in a special cell;

producing charging information related to the at least one mobile station, the charging information including at least one detail item indicating a corresponding event which affects charging;

classifying the at least one detail item into at least one class of multiple classes depending, at least, on whether the corresponding event occurred while the at least one mobile station was in one of its corresponding special cells; and performing or at least supporting the classification using the at least one mobility support element.

3. A cellular radio network configured to support circuit-switched and packet-switched connections with a mobile station, the network comprising:

a plurality of cells, at least one of which being associated with one or more mobile stations as one of a set of special cells associated with respective ones of the mobile stations, the special cells associated with mobile stations being configured to provide at least one special service to the associated mobile station;

at least one radio control element configured to determine whether a mobile station is in a special cell associated with that mobile station;

at least one mobility support element configured to receive, when it begins to serve the mobile station, an indication of the set of special cells associated with the mobile station, and configured to send the indication of the set of special cells associated with the mobile station to the at least one radio control element; and at least one charging element configured to receive charging information related to mobile stations, the charging information including at least one detail item, each at least one detail item indicating an event which affects charging, wherein the at least one mobility support element is configured to support or perform classification of the at least one detail item into at least one class of multiple classes depending, at least, on whether the corresponding event occurred while the mobile station was in one of its special cells associated with the mobile unit.

4. The cellular radio network of claim 3, wherein the at least one mobility support element is a serving GPRS support node configured to compare the cell identity of the mobile station's current cell with the indication of the set of special cells associated with the mobile station.

5. The cellular radio network of claim 3, wherein substantially each detail item indicates whether the cell in question is one of the mobile station's corresponding special cells.

6. The cellular radio network of claim 3 wherein the at least one mobility support element is configured to support or perform organisation of detail items including the at least one detail item as consecutive records, wherein substantially each record contains an indication of whether all events indicated by the at least one detail item of the record occurred while the mobile station was in one of its corresponding special cells.

7. The cellular radio network of claim 3, wherein the at least one mobility support element is configured to insert into the at least one detail item the identity of the cell associated with the location of the mobile station at the occurrence of the event.

8. At least one mobility support element for a cellular radio network including a plurality of cells, and configured to support circuit-switched and packet-switched connections with at least one mobile station, the at least one mobility support unit comprising:

a receiver configured to receive, when the at least one mobility support element begins to serve the at least one mobile station, a list of predefined special cells associated with the at least one mobile station and configured to provide at least one special service to the at least mobile station;

a transmitter configured to transmit the list of pre-defined special cells associated with the at least one mobile station to at least one radio control element configured to determine whether the at least one mobile station is in a special cell associated with that mobile station, wherein the at least one mobility support element is configured to support or perform classification of at least one detail item included in charging information into at least one class of multiple classes depending on whether an event corresponding to the at least one detail item occurred while the at least one mobile station was in one of its corresponding special cells.

9. A charging-related message for a cellular radio network including a plurality of cells, each cell having a cell identity, and configured to support circuit-switched and packet-switched connections with a mobile station, wherein the charging-related message includes at least one detail item for substantially each event that affects charging of a subscriber of the mobile station and, for substantially each detail item, the charging-related message is configured to at least indirectly indicate whether the mobile station was in one of its corresponding special cells when the corresponding event occurred.

* * * * *